INVENTOR
HAROLD H. BELCHER

BY
ATTORNEYS

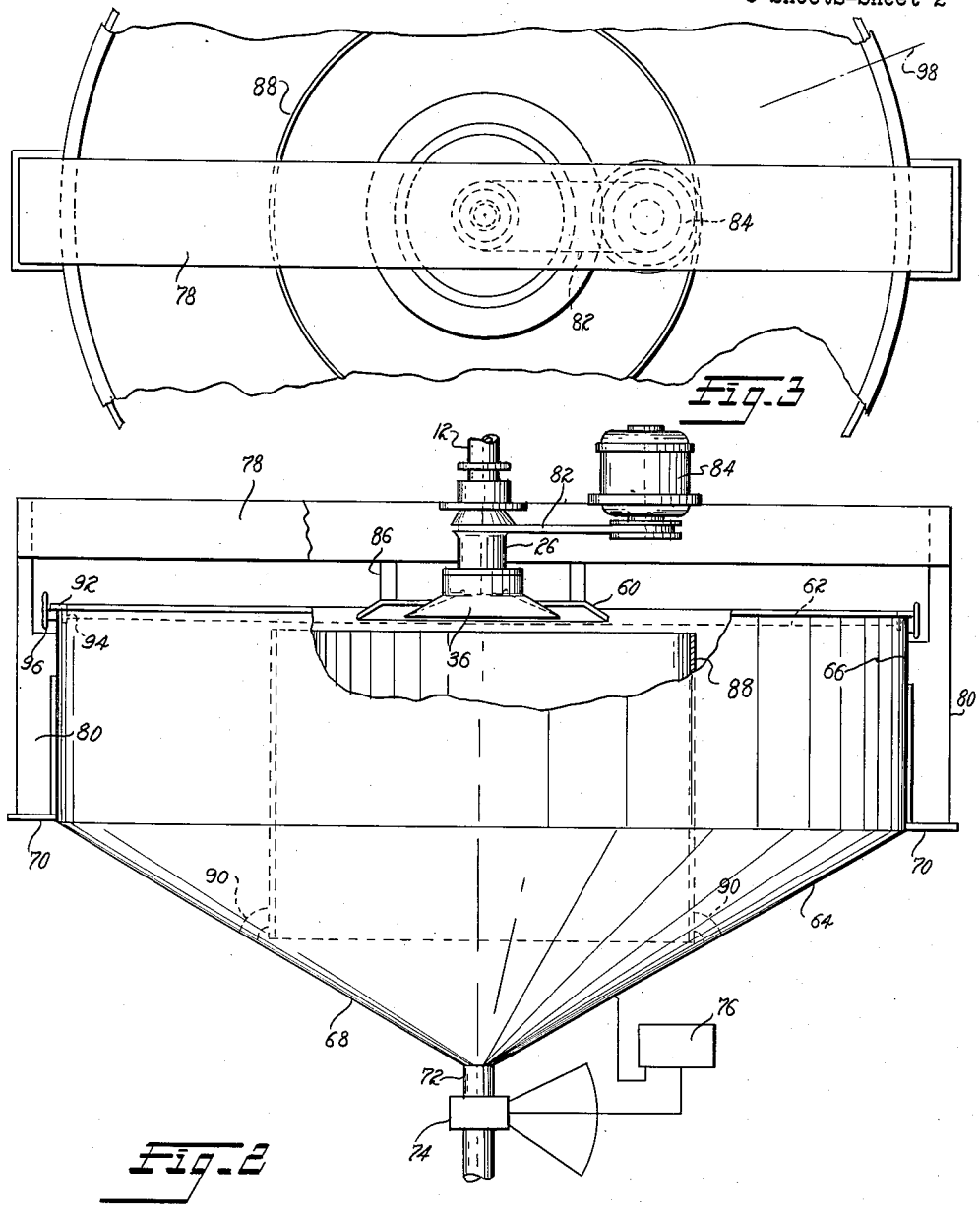

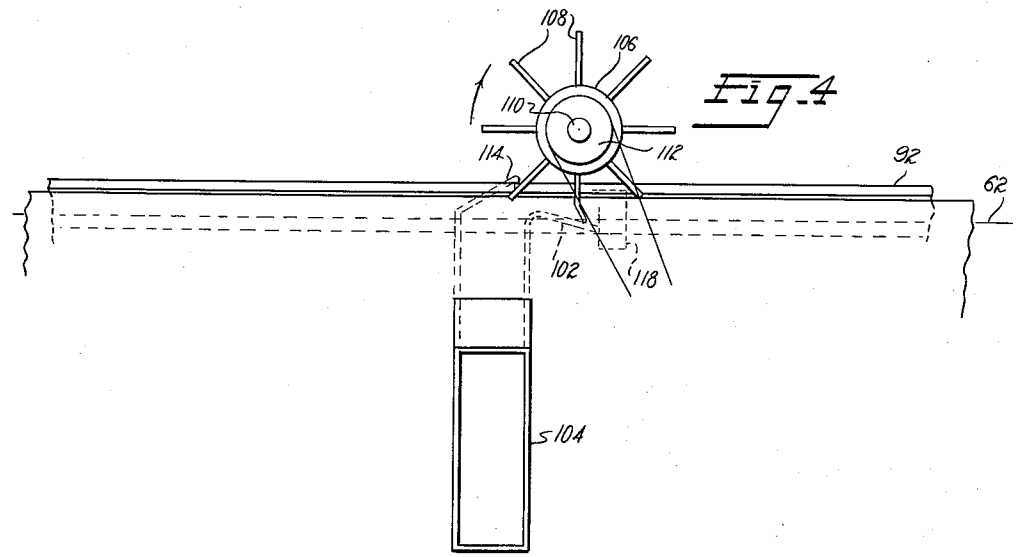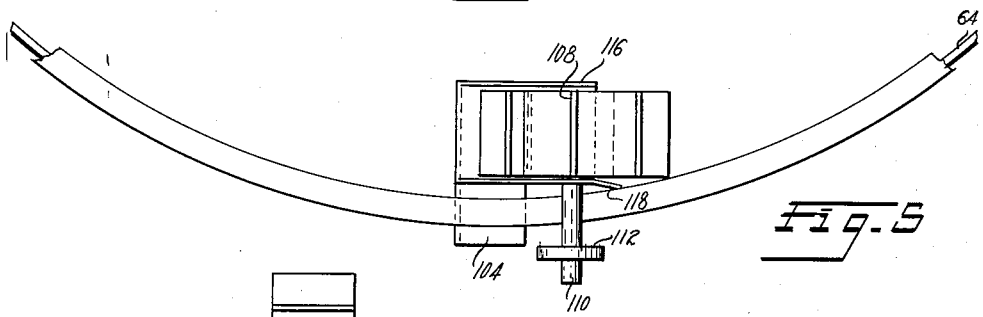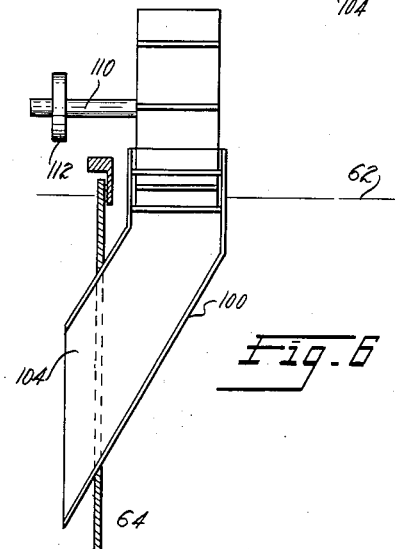

Jan. 31, 1961

H. H. BELCHER 2,969,879

LIQUID AND GAS MIXING MACHINE

Filed May 31, 1955

INVENTOR
HAROLD H. BELCHER

BY Strauch, Nolan & Diggins

ATTORNEYS

United States Patent Office 2,969,879
Patented Jan. 31, 1961

2,969,879

LIQUID AND GAS MIXING MACHINE

Harold H. Belcher, Orange, Mass., assignor to Rodney Hunt Machine Co., Orange, Mass., a corporation of Massachusetts Filed May 31, 1955, Ser. No. 511,937

1 Claim. (Cl. 210—70)

This invention relates to an apparatus and process for obtaining intimate contact between a liquid and a gas for purposes of reaction, absorption, mixing, clarification, etc., and more particularly relates to an application of this method and apparatus to a flotation process wherein suspended matter in a liquid is floated out by the attachment of bubbles of air or other gas to the particles of suspended matter.

The requirements of a successful flotation process for removing suspended particles from a liquid are: first, that the surface of the suspended particles tend to repel water, showing a preferential attraction for air or other gas; second, that the air be supplied in a manner which brings it into contact with the suspended particles; and third, that after aeration the liquid passes to a separation zone with flow characteristics which allows the aerated particles to rise to the surface for removal while the water and untreated suspended matter settles downward for removal as underflow.

Equipment heretofore utilized meets these requirements in different ways with varying degrees of success. While the surface of the suspended matter may already have a hydrophobic character this is not usually the case and ordinary practice is to add to the liquid small amounts of various chemicals to alter the surface characteristics. For example, small amounts of glue or wax emulsion very effectively alter the surface characteristics of cellulosic fiber such as is found in paper mill "white water" waste, so that in the presence of a proper air supply, air attached itself to the fiber giving it a net specific gravity less than that of water causing it to rise.

In the field of mineral ore separation hundreds of conditioning additives are known, each being effective on certain minerals or groups. If the ore is crushed or ground quite fine and carried in water as a suspension or "pulp," a given component of the ore may be separated by first adding a chemical to alter the surface characteristics of that component and then supplying air in such a manner that the particles of the treated component pick up enough air to cause them to rise to the surface as a scum or froth while the water and unaffected mineral particles sink to the bottom outlet of the separator. Other chemicals may be added which, while not affecting the surface condition of the fiber, may produce a lighter, finer froth or cause other effects which improve operation of the equipment.

Such chemical additions are sometimes made in holding tanks ahead of the flotation equipment, sometimes in the pump lines feeding the flotation machine, and sometimes in the flotation machine itself. In any event effective flotation cannot be obtained until sufficient time has elapsed for the additions to diffuse through all parts of the liquid so that all suspended matter is conditioned to permit attachment of air.

Air has been supplied to flotation machines in many different ways. The simplest and probably the least effective is by means of submerged perforated pipes connected to a compressed air supply. The bubbles obtained in this manner are too large to be effective and compression costs are high. Finer bubbles and better bubble distribution have been obtained by using porous ceramic elements through which compressed air is forced, although even in this case the bubbles are larger than desired, compression costs are still high, and the porous materials are subject to clogging.

Still finer air bubbles have been obtained by using rotating porous members through which air is forced. Machines have also been built utilizing compressed air with high speed submerged impellers and in some cases utilizing air introduced at the impeller by the pumping action of the impeller itself. Each of these alternates is much more effective than the earlier pipes and porous elements, but is still not entirely satisfactory from the standpoint of power, bubble size, distribution, etc.

A further system for obtaining very fine air bubbles consists of a pump with an air aspirator on the inlet side, closed holding tank on the discharge side, and a special fine orifice relief valve leading to the flotation machine. The feed liquid is pumped into the holding tank along with air pulled in by the aspirator, is held in the tank at high pressure for a moderate time, and is then discharged through the special valve into the flotation unit. Since the water in the holding tank is under pressure it dissolves some of the air coming from the pump and on discharge to the flotation unit this air is released in the form of very small bubbles.

In all of these systems the air bubbles rise through the water to the surface and may contact particles of suspended matter in so doing. Published research on the mechanics of the attachment of air bubbles to suspended particles has shown that there is a finite time element involved during which the liquid film on the particles progressively thins out and eventually ruptures to allow direct contact between the particles and the air in the bubbles. Because of this time element large bubbles which rise very rapidly are not adjacent to a particle long enough for this process to be completed and are therefore not effective in flotation. Fine bubbles, on the other hand, rise very slowly and if enough are present have a good opportunity of making contact with suspended matter. However, if the suspended matter is heavier than water, and if the particles are comparatively large, several bubble contacts may be required before the particle picks up enough air to give it a net specific gravity less than that of water.

In current flotation machines a certain portion of the flotation machine is set aside for carrying out this process of contacting air bubbles and particles. The process however is a random one, is not completely effective, and much air is injected which never does contact a particle. In most such units the separation of aerated particles from the water takes place in a relatively quiescent zone which is in communication with the aeration or contacting zone but is separated from it. Flow conditions in this quiescent zone must be such that the aerated particles will rise to the surface even though some may be very light and others only slightly lighter than water. In order to avoid an outflow of aerated material with the water the rate of downward water flow must not exceed the rate of rise of the aerated particles and generally speaking the water flow rate is governed by the rise rate of the more slowly moving aerated particles. Separating basins or tanks are very large, and throughput capacity is usually limited to 3–4 gallons per minute per square foot of separation basin surface. The floated material may be in the form of foam, froth, scum, slush, etc., and may be removed by any suitable means such as conveyors, racks, suction pumps, etc.

In contrast to the operation of the previously available flotation units described hereinabove, the flotation machine of this invention operates according to a process which accomplishes what might be termed "pre-aeration," meaning that the suspended matter is already attached to air before reaching the tank or separator.

According to the invention this pre-aeration is accomplished by introducing the feed, already chemically treated as required, to the center of a high speed conical disc, which rapidly accelerates the liquid outward as a thin turbulent film, discharging it from the disc lip as a spray of very minute droplets. During the passage over the disc as a thin, very turbulent film, suspended fibers or particles are exposed to the air, and the violent motion involved ruptures surface films almost instantaneously to give very free contact between the air and the particles. This action is further continued during the high speed flight of the minute droplets away from the disc.

According to a further feature of the invention the spray from the disc is then impinged upon the inclined surface of a conical deflection ring surrounding the disc, where the spray droplets coalesce to reform a film on the deflector. The film in turn discharges from the lower edge of the deflector in the form of a flat conical spray which flies a short distance to the surface of the water in the separating tank, the level being maintained at a point only very slightly below the deflector. This form of discharge is due to the fact that the deflector does not dissipate all of the rotational momentum of the spray, but leaves a sufficient amount to project the spray in the foregoing manner.

The combined action of the disc, the spray from the disc, and the deflector, all of which is accomplished in a fraction of a second, entraps a large amount of air in the liquid with most of the air being directly attached to particles of suspended matter. The degree of aeration of each particle is high since aeration has been from exposure to free atmospheric air rather than to one or two very tiny air bubbles as in the case in most previous machines. The disc and deflector therefore accomplish the functions performed in previous machines by air compressors, pipes, porous elements, pumps, aspirators, agitators, holding tanks, special valves, etc., and the mixing or contacting section of the flotation machine itself.

The spray from the deflector flies in a flat cone to the surface of the liquid in the separator, striking the surface at a flat angle so that no deep turbulence is produced, and almost immediately forming a froth of aerated suspended matter on the surface of the liquid. The clarified liquid and any untreated suspended matter passes downward and leaves the bottom outlet of the separator. Since nearly all suspended matter is very thoroughly aerated before reaching the surface of the separator there is very little material having a specific gravity close to that of water and consequently much higher downward water velocities can be used without danger of carrying down aerated material. Tests have demonstrated excellent performance with through-put capacities of 8 to 10 gallons per minute per square foot of separating tank surface. Further, since no volume of the separating tank has to be provided for establishment of particle-bubble contact, the separating tank may be made relatively shallow as compared with previous machines.

It is accordingly a primary object of the present invention to provide a novel method and apparatus for obtaining intimate contact between a liquid and a gas.

It is another object of the present invention to provide a novel method and apparatus for obtaining intimate contact between a liquid and a gas for purposes of reaction, absorption, mixing, clarification, flotation, etc.

It is another object of the present invention to provide a method and apparatus for obtaining intimate contact between suspended particles in a liquid and a gas through a process of pre-aeration wherein the suspended matter is attached to the gas before reaching any tank or separator.

It is another object of the invention to provide a method and apparatus for obtaining intimate contact between a liquid and a gas by distributing the liquid as a thin turbulent film and as a spray in contact with the gas.

It is another object of the invention to provide a method and apparatus for obtaining intimate contact between a liquid and a gas by introducing the liquid to the center of a high speed disc which rapidly accelerates the liquid outward as a thin turbulent film discharging it from the disc lip as a spray of very minute droplets.

It is another object of the present invention to provide a method and apparatus for obtaining intimate contact between suspended particles in a liquid and a gas wherein the liquid containing the suspended particles is introduced to the center of a high speed conical disc which rapidly accelerates the liquid outward as a thin turbulent film discharging it from the disc lip as a spray of very minute droplets, during which time the suspended particles are exposed to the surrounding gas and the violent motions involved rupture surface films on the particles almost instantaneously giving very free contact between the surrounding gas and the particles.

It is another object of the invention to provide a method and apparatus for obtaining intimate contact between suspended particles in a liquid and a gas wherein the liquid containing the suspended particles is introduced to the center of a high speed conical disc which rapidly accelerates the liquid outwardly as a thin turbulent film discharging it from the disc lip as a spray of minute droplets which enter a body of liquid therebelow at a flat angle without causing deep turbulence.

It is another object of the invention to provide a method and apparatus for obtaining intimate contact between suspended particles in a liquid and a gas wherein the liquid containing the suspended particles is introduced to the center of a high speed conical disc which rapidly accelerates the liquid outward as a thin turbulent film discharging it from disc lip as a spray of very minute droplets which is impinged upon the inclined surface of a conical deflector surrounding the disc, where the spray droplets coalesce to reform a film on the deflector.

It is another object of the present invention to provide a method and apparatus for obtaining intimate contact between a liquid containing suspended particles and gas wherein the liquid is introduced into the center of a high speed conical disc which rapidly accelerates the liquid outward as a thin turbulent film, discharging it from the disc lip as a spray of very minute droplets which impinge upon the inclined surface of a conical deflector surrounding the disc, where the spray droplets coalesce to reform a film on the deflector and then leave its lower edge in the form of a flat conical spray which strikes the surface of a body of liquid therebelow at a flat angle.

It is a further object of the present invention to provide a flotation machine for separating selected suspended particles from a liquid wherein the suspended matter is attached to a gas before it is introduced into any tank or separator.

Further objects and advantages of the invention will become apparent upon reference to the following specification, claim and drawings wherein:

Figure 2 is a side elevation of a flotation machine utilizing the aeration disc assembly of Figure 1;

Figure 3 is a partial plan view of the flotation unit of Figure 2;

Figure 4 is a partial side elevation of one type of skimmer mechanism for removal of flotation foam or froth;

Figure 5 is a partial plan view of the skimmer mechanism of Figure 4;

Figure 6 is an elevation of the skimmer mechanism of Figure 4;

Figure 1:
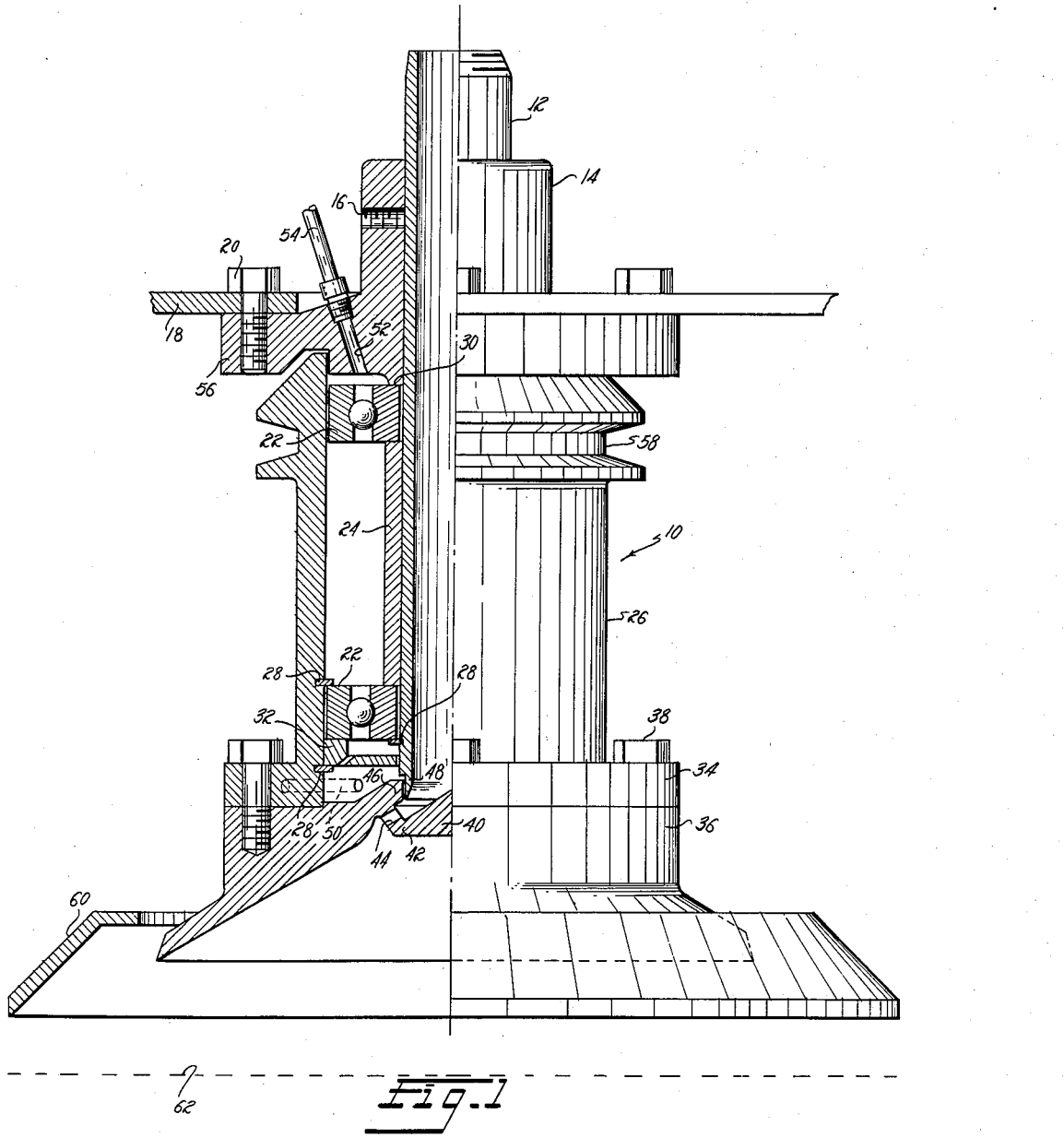
Figure 1 is a vertical elevation, partly in section, of the centrifugal disc and deflector assembly of a flotation machine constructed according to the invention.

Referring to Figure 1, a disc assembly indicated generally at 10 is built around a vertical central feed tube 12, retained in a mounting flange 14 by any suitable means, such as set screw 16. Mounting flange 14 is bolted to supporting frame 18 by bolts 20.

A pair of ball bearings 22 and a spacer sleeve 24 are mounted on the outside of feed tube 12 and a main rotor case 26 is carried on the outer races of ball bearings 22. Three snap rings 28, one in the feed tube 12 and two in the rotor case 26, serve to position all parts of the unit in the vertical direction. The ball bearings are held from vertical movement on the center tube 12 by lower snap ring 28 and by mounting flange 14 which has a lower hub or projecting sleeve 30 contacting the inner race of the upper bearing. Rotor case 26 is held from vertical movement by the two snap rings 28 and these are spaced apart only enough to accommodate the outer bearing race and a spacer collar 32.

Rotor case 26 is provided with a flange 34 at its lower end and this is bolted to a conical aeration disc 36 by bolts 38. Disc 36 is formed with a central portion 40 connected to the disc proper by a relatively thin portion 42 which is pierced by a number of equally spaced distributor holes 44. The upper surface of disc portion 40 is conically shaped to assist in deflecting feed liquid from the vertical feed pipe 12 to the distributing holes 44.

A portion 46 of disc 36 overlaps a reduced diameter section 48 at the lower end of feed pipe 12 with a very small running clearance and there is a similar small running clearance between the outside diameter of feed pipe 12 and the inside diameter of spacer collar 32. The space just below collar 32 and above disc 36 forms a purge chamber which is open to the atmosphere through a number of radial holes 50 in the bottom flange of rotor case 26.

The unit is designed for lubrication by a mist or fog of oil carried in a compressed air stream and mounting flange 14 is drilled at 52 and provided with a lubrication supply pipe 54 to bring the oil mist into the interior of rotor case 26. The lower hub or projecting sleeve 30 of mounting flange 14 extends into the bore of case 26 with a small running clearance and the upper surface of case 26 and the flange 56 of mounting flange 14 are shaped to provide a protected path or labyrinth to prevent accidental introduction of dust or liquid into the unit. In operation the fan action of the holes 50 maintains a slight negative pressure in the purge chamber below spacer 32 which draws the oil mist down through the two bearings and out the holes 50. If any feed liquid should enter this purge chamber through the narrow clearance between feed tube 12 and disc 36 it will be thrown out holes 50 by centrifugal force. Normally, however, the pumping capacity of the disc through holes 44 exceeds the rate of feed to the feed pipe 12 so that a negative pressure exists at the lower end of center tube 12 preventing flow of liquid into the purge chamber.

The rotor case 26 is machined as at 58 to provide for V belt drive from a motor not shown.

In operation liquid feed which has been chemically treated to give desired surface characteristics to the suspended matter is introduced at a controlled rate to the top of feed tube 12. The rotor case and disc are driven at high speed and the center part of the disc and the section carrying holes 44 act as a pump to discharge the liquid to the conical under surface of the disc 36. The disc accelerates the liquid in a rotary direction and centrifugal force drives it radially outward as a film until it is discharged as a nearly horizontal extremely flat cone spray.

A deflector ring 60 with a conical under surface is mounted at such a level that the spray from the disc strikes the conical surface of the deflector, diverting the liquid down the slope to the lower lip, and discharges again as a conical spray to the surface of the liquid 62 in the separator tank. The deflector acts to take some of the energy out of the spray hitting it, but enough rotational energy persists to cause the desired flat cone spray at that point as the liquid leaves the deflector.

Figure 2 and Figure 3 show a flotation machine utilizing the aeration disc of Figure 1. The machine consists of a tank 64 with a cylindrical upper portion 66 and a conical lower portion 68 supported on foundations in any suitable manner, as for example by pads 70. The tank is provided with a center discharge pipe 72 at the bottom and with a means of controlling the water level in the tank such as a control valve 74 and automatic liquid level controller 76. Obviously, other level control devices such as a riser pipe and overflow weir may be used.

A cross frame or bridge 78 is mounted over the tank by suitable supports such as legs 80. The disc assembly of Figure 1 is mounted from the bridge 78 with feed pipe 12 extending above the bridge and rotor case 26 and disc 36 below the bridge. Rotor disc 26 is driven by V belt 82 from motor 84, also mounted on the bridge. Deflector 60 is also mounted below the bridge by supports 86 with the lower edge of the deflector a short distance above the water level 62.

In operation the spray from the deflector contacts the water at a very acute angle a few inches from the deflector and the spray has both radial and tangential velocity components so that the froth forming on the surface is propelled in a spiral outward toward the tank rim. This motion sets up a slow moving flow of the liquid as a whole and the forces present tend to produce a slowly rolling over torroidal or doughnut shaped flow with the whole mass rotating slowly about the tank axis. This torroidal flow is undesirable as it induces areas of upflow in the tank thus reducing the effective down-flow area. The torroidal motion may be controlled by one or more cylindrical shells 88, mounted in the tank as by gussets 90, so that the top of the shell is slightly below water level 62 and the bottom of the shell in a few inches away from the cone bottom of the tank 64.

There are many possible ways of skimming the foam or froth from the tank. I prefer to do it at one point rather than around the entire circumference and therefore it is necessary to keep the whole froth surface in spiral motion. The rim of the tank is the only contact with this froth layer and as most froths are somewhat sticky all motion of the froth would soon stop if a stationary tank rim were used. I, therefore, have shown a rotating ring rim section 92 having a horizontal ring extending outside the rim of tank 64 and a vertical cylindrical section 94 extending down just inside the tank to below the water level 62. Ring 92 is supported at three or more points by flanged rollers 96, one of which is power driven (not shown), to effect very slow rotation of the ring 92 in the same direction as the disc 36. It is desirable that this direction be the direction of swirl induced by precession effects on the water passing out discharge pipe 72.

In operation the preaerated particles stay on the surface as a froth driven in an outward spiral by the energy of the spray. Water and heavy untreated particles settle downward carrying along some very fine air bubbles which are not attached to particles. Some of these very fine bubbles may combine to form more buoyant bubbles which will rise and some may continue with the water passing out pipe 72. The froth extending to the rim ring 92 slowly rotates to the skim point indicated positionwise as at 98, where it is removed by any suitable device.

Figures 4, 5 and 6, show one of the many skimmer devices which might be used to remove the froth as it comes around to the skimming point. In the side of the tank 64 a foam trough 100 is mounted. This trough is rectangular in section and is mounted with the top edge slightly above liquid level 62. This edge has an extension 102 facing the oncoming foam and sloping gradually downward to terminate below the water level 62. The trough extends downward a short distance and angles outward through the tank wall as a discharge spout 104. Mounted above the trough extension 102 is a paddle wheel consisting of hub 106 and flexible blades 108, the unit being mounted on shaft 110 and driven by pulley 112 and belt from a power source not shown. The wheel is mounted in position so that the blades enter the foam layer pushing the foam up the sloping extension and into the trough. To prevent build up on the flexible blades the top of the trough on the side opposite the extension 102 may be extended as at 114 to scrape the blades as they pass and extension 102 may be provided with upstanding sides 116. Extension 102 may also carry a scraper blade 118 bearing against the inside face of ring 92 to prevent build up of material on the ring.

Figure 7:
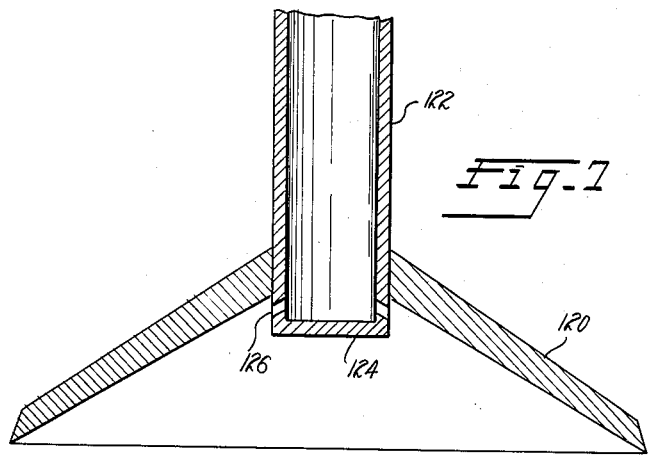
Figure 7 is a vertical section of another embodiment of a centrifugal disc constructed according to the invention.

While the rotating disc described in connection with Figures 1, 2, and 3 is associated with a stationary downwardly extending feed tube, other types of disc arrangements may be utilized. Thus, referring to Figure 7, there is shown a conical disc 120 which is attached to a rotating feed tube 122 having a closed lower end 124 and radial downwardly directed ports 126. The rotating feed tube 122 may be mounted in conventional bearings.

Figure 8:
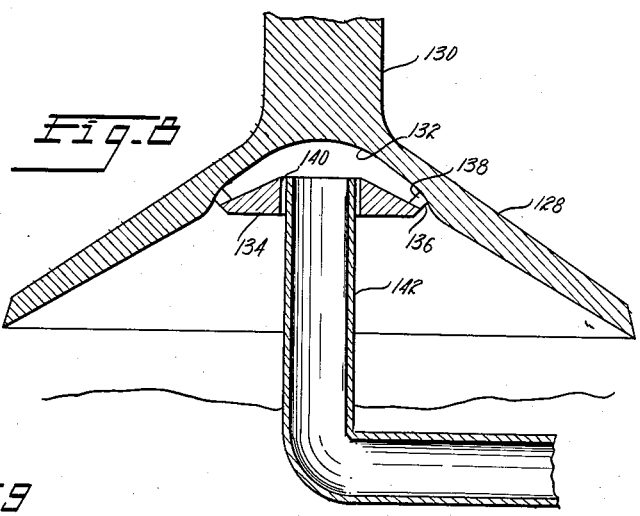
Figure 8 is a vertical section of a further embodiment of a centrifugal disc constructed according to the invention.

Referring to Figure 8 there is shown still another embodiment of the invention using an upwardly extending feed tube. According to this embodiment a conical disc 128 is carried by a shaft 130 mounted for rotation in any suitable journal, not shown. The disc 128 is provided with a cavity 132 which is partially closed by a further disc 134 attached to the underside of conical disc 128 by means of an upturned lip 136 provided with a number of equally spaced apertures 138 therearound. The disc 134 is provided with a further central aperture 140 which receives the upper end of an upwardly extending feed tube 142 with a small running clearance therebetween. In this embodiment of the invention the liquid containing the suspended particles is pumped through feed pipe 142 into the cavity 132 from which it escapes through ports 138 to the underside of the whirling disc 128.

Figure 9:
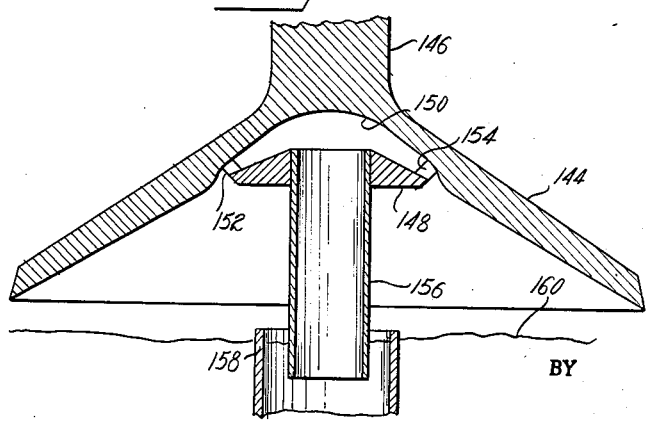
Figure 9 is a vertical section of still a further embodiment of a centrifugal disc constructed according to the invention.

Referring to Figure 9 there is shown a still further embodiment of the invention wherein a conical disc 144 similar to that shown in Figure 8 is carried by a rotatably mounted shaft 146 and in turn carries a disc 148 mounted in a cavity 150 by means of up turned lip 152. As in the embodiment of the invention shown in Figure 8 the lip 152 is provided with a series of equally spaced apertures 154 through which the liquid may escape. Contrary to the construction shown in Figure 8, however, the disc 148 in this embodiment of the invention fixedly carries a downwardly extending tube 156 which enters a riser pipe 158 extending just above the surface 160 of the liquid in the separating tank. The riser pipe 158 extends downwardly into the liquid and terminates short of the bottom of the tank so that when the disc 144 is whirled at high speed liquid from the tank is sucked upwardly by centrifugal force into the tube 156 and thence through the ports 154 to the underside of the conical disk 144. Still further variations in disc structure are possible and it is to be understood that the arrangements illustrated herein are intended to be illustrative only and not restrictive in nature.

Figure 10:
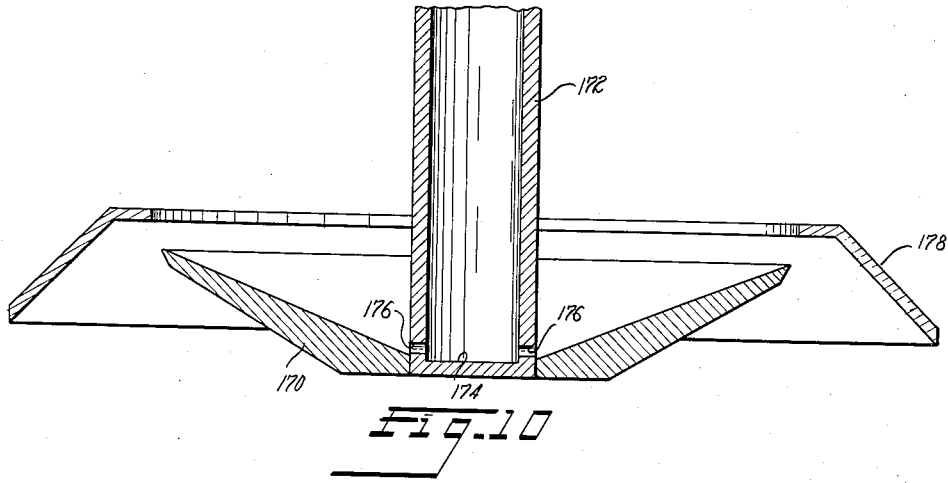
Figure 10 is a vertical section of another embodiment of a centrifugal disc constructed according to the invention.

While the rotating discs described in all of the preceding embodiments of the invention have had a downwardly facing concavity the concavity may face upwardly and although the disc is preferably cone shaped according to the preferred embodiment of the invention it may also be perfectly flat. Thus referring to Figure 10 there is shown a dish-shaped conical disc 170 which is attached to a rotating feed tube 172 having a closed lower end 174 and radial ports 176. A deflector ring 178 surrounds the disc 170 in the same manner as in the embodiment of the invention shown in Figure 1.

Figure 11:
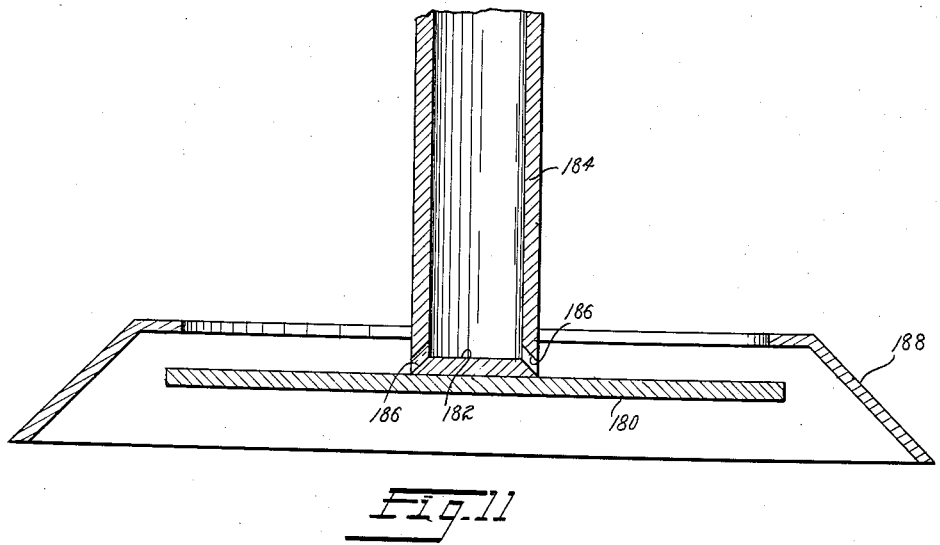
Figure 11 is a vertical section of still another embodiment of a centrifugal disc constructed according to the invention.

Referring to Figure 11 there is shown an embodiment of the invention using a flat disc 180 which is attached to the closed end 182 of a feed tube 184 having downwardly directed radial ports 186. As in the preceding embodiments of the invention the disc 180 is surrounded by a deflector 188.

It will be apparent from the foregoing that I have provided a simple and inexpensive apparatus and method for efficiently mixing a liquid and a gas in an extremely short period of time. While the invention has been described in terms of its adaptations to a flotation system this has been by way of illustration only and it will be understood that it may be utilized equally well in a large variety of other environments, such as for mixing a liquid and gas for purposes of reaction, absorption, mixing, clarification, etc.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A method of separating particles from a liquid by flotation comprising the steps of propelling said liquid and particles across substantially all of a disc like rotating surface in the form of a thin unrestrained turbulent film in contact with said surface on one side and a gas on the other side to establish intimate contact between said particles and said gas, impinging said liquid onto the surface of a body of liquid at an angle sufficiently acute to prevent turbulence of said body of liquid, and skimming said body of liquid.

References Cited in the file of this patent

UNITED STATES PATENTS

| 1,310,051 | Blomfield | July 15, 1919 |
| 1,752,434 | Howard | Apr. 1, 1930 |
| 2,040,351 | Williams | May 12, 1936 |
| 2,220,574 | Little | Nov. 5, 1940 |

FOREIGN PATENTS

| 291,341 | Italy | Dec. 15, 1931 |
| 208,141 | Great Britain | Nov. 29, 1923 |